United States Patent Office 3,342,293
Patented Sept. 19, 1967

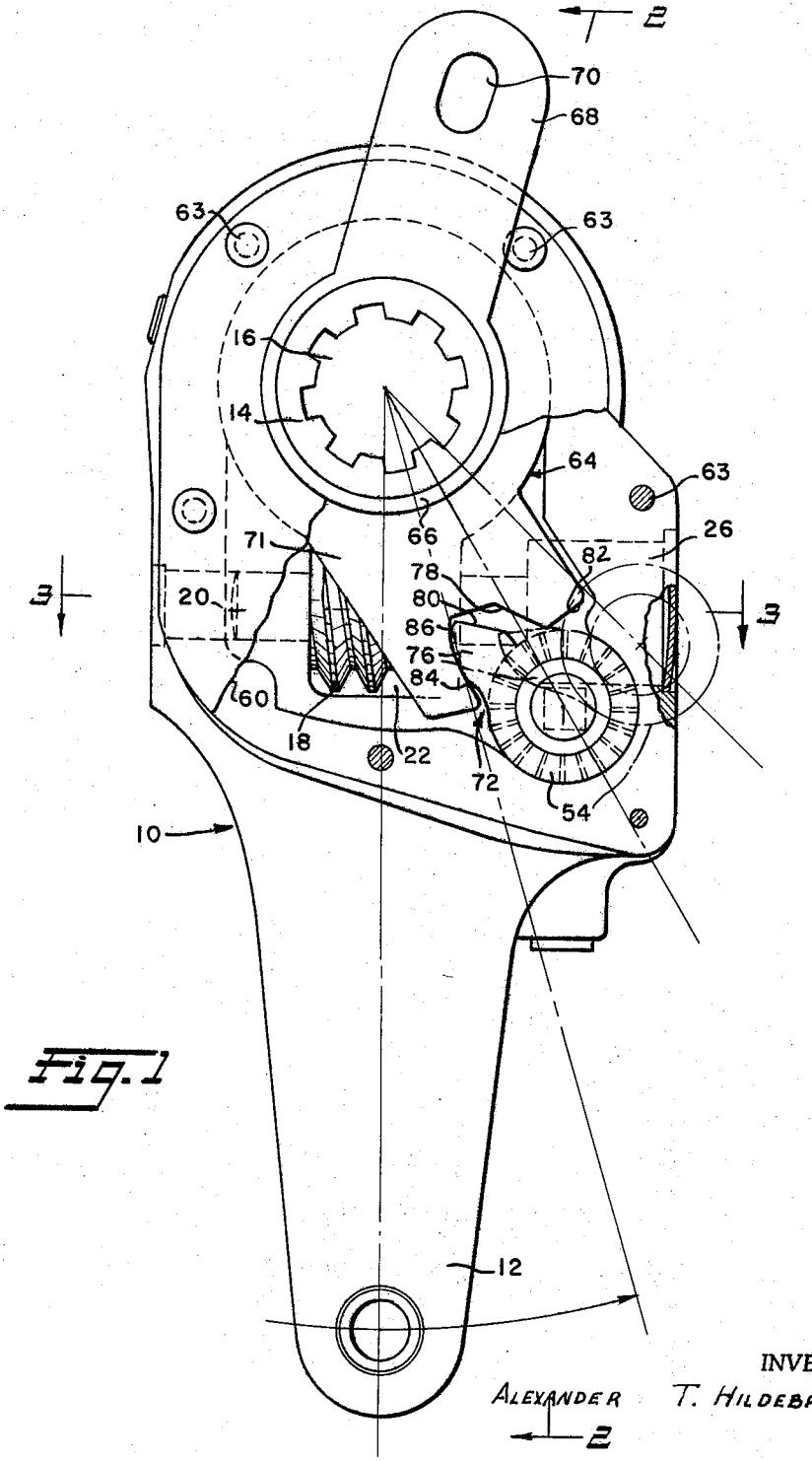

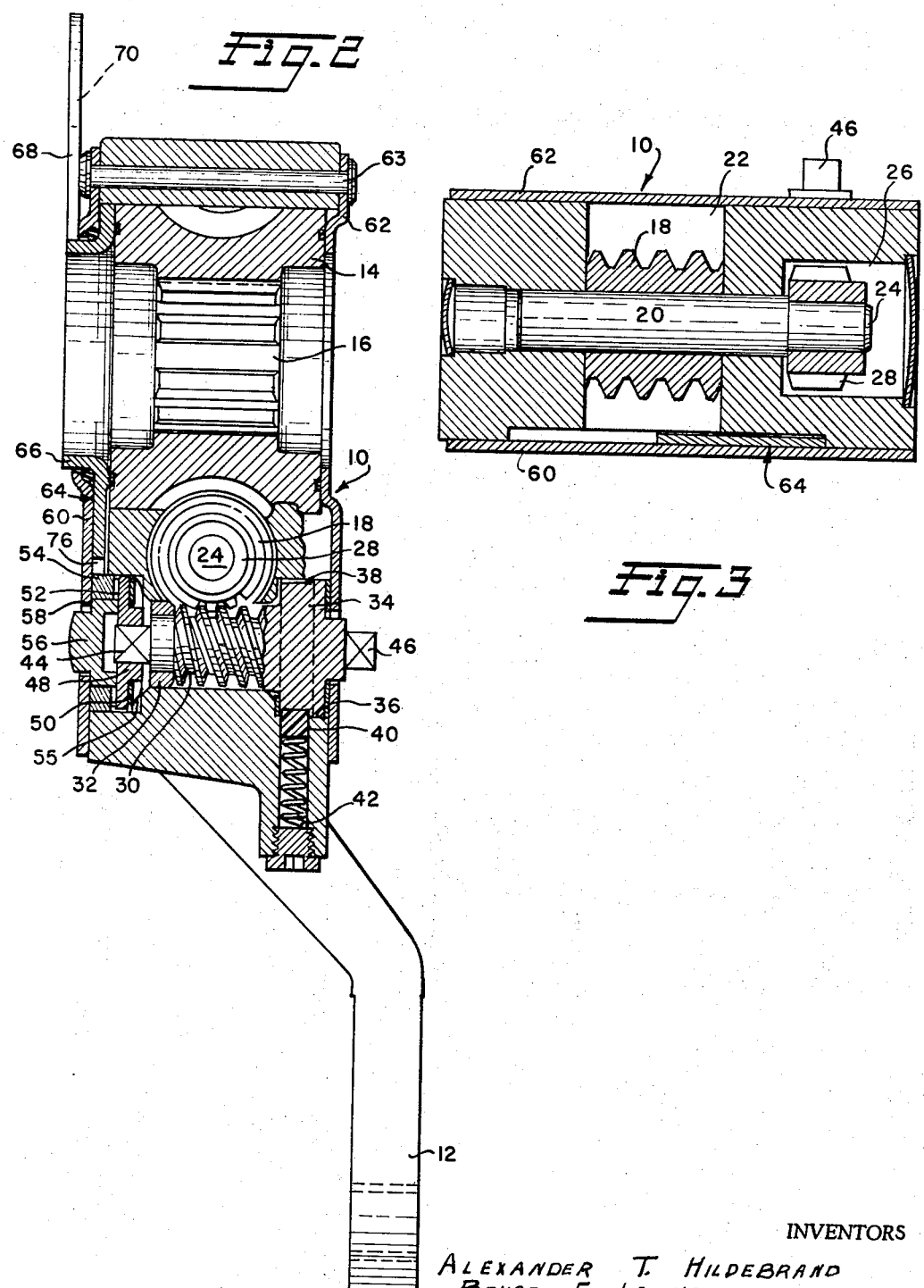

3,342,293
AUTOMATIC SLACK ADJUSTER
Alexander T. Hildebrand and Bruce E. Latvala, Elyria, Ohio, assignors to Bendix-Westinghouse Automotive Air Brake Company, Elyria, Ohio, a corporation of Delaware
Filed June 29, 1965, Ser. No. 467,936
12 Claims. (Cl. 188—196)

This invention relates to automatic slack adjusters for vehicle brakes and more particularly to brake operating mechanism which is automatically adjusted in response to movement of the brake beyond its normal range of operation due to brake wear.

Automatic slack adjusters for brakes, particularly of the fluid pressure operated variety, have been proposed in the prior art but generally such slack adjusters have not been entirely satisfactory because of a tendency under high load conditions for the adjusters to over-adjust. That is to say, where ratchet means are employed for effecting brake adjustment it frequently happens that the ratchet indexes more than one tooth increment so that on brake release the adjustment is multiplied over that which is actually required.

The principal object of the present invention is to provide an improved automatic slack adjuster which overcomes the disadvantages of prior art adjusters.

More particularly it is an object of the invention to provide an improved automatic slack adjuster which is constructed and arranged so that it can never under any circumstances index more than one ratchet tooth upon a single brake application.

Other objects and their attendant advantages will become apparent as the following detailed description is read in conjunction with the accompanying drawings wherein:

FIG. 1 is a side elevational view, partly broken away, of a slack adjuster incorporating the features of the present invention;

FIG. 2 is a vertical cross-sectional view taken substantially on the line 2—2 of FIG. 1; and FIG. 3 is a horizontal cross-sectional view taken substantially on the line 3—3 of FIG. 1.

Referring now to the drawing the slack adjuster of the present invention comprises a body 10 having an upstanding lever part 12 adapted to be connected to the usual brake actuating rod. The main part of the body 10 is hollow and includes a main worm gear 14 having an internally splined opening 16 adapted to be received on the brake operating cam shaft. The worm gear 14 is engaged by a main worm 18 which is rotatably supported on a shaft 20 journalled in bearings in opposite sides of a U-shaped recess 22 formed in the body 10, and, as illustrated in FIG. 3, the shaft 20 carries at one end an integral extension 24 which projects into a second chamber 26 and carries a secondary worm gear 28.

As seen in FIG. 2 the worm gear 28 is engaged by a secondary worm 30 which is rotatably supported at one end by a bushing 32 with the other end being provided with an integral enlarged circular part 34 rotatably received in and supported by a cylindrical recess 36 formed in the side wall of the body 10. The outer peripheral surface of the enlarged part 34 is provided with a knurled surface 38, receiving a cylindrical plastic plug 40 which is urged by the spring 42 into frictional engagement with the knurled surface to retain the gear train in any given position.

The worm 30 is provided at its opposite ends with square shanks 44, 46, the right hand shank 46 extending beyond the body of the adjuster to receive a wrench for manual adjustment as will become apparent. The left hand shank 44 slidingly receives a driven ratchet 48 having ratchet teeth 50 engaging ratchet teeth 52 of a drive ratchet 54 hereinafter described in detail.

The driven ratchet 48 is urged by a ratchet spring 55 to the left in FIG. 2 so that the teeth are operatively engaged with the mating teeth of the drive ratchet. Engaging the outer face of the driven ratchet is a button member 56 which can be manually pushed inwardly against the spring 55 until the drive and driven ratchet teeth disengage whereupon the gear train can be manually operated to back the shoes away from the brake drum when a wrench is applied to the right hand shank 46. The button 56 is provided with an annular shoulder 58 engaged by the inner face of a cover plate 60 which is connected to a mating cover plate 62 on the opposite side of the slack adjuster body by a plurality of rivets 63 as shown particularly in FIG. 2.

In accordance with the invention means are provided for automatically indexing the gear train when the slack adjuster is moved a greater than normal amount due to brake wear. This automatic means comprises a cam plate, broadly indicated by the numeral 64, which is retained in position by the cover plate 60, as shown in FIG. 2, and is provided with a shoulder part 66 which is co-axial with the splined opening 16 through the main worm wheel 14. The shoulder part 66 has rigidly affixed thereto an indexing arm 68 which, as shown in FIG. 1, is provided with an opening 70 at its outer end adapted to receive a fastening element for rigidly connecting the arm 68 to a relatively fixed part of the vehicle; that is to say, when the arm 68 is connected to the vehicle the cam plate 64 is held by the arm against rotation as the slack adjuster is rocked between applied and released positions.

As best seen in FIG. 1 the cam plate 64 is provided with a second arm 71, behind the cover plate 60, containing a cam slot 72 which receives a projection or tusk 76 integral with the drive ratchet 54 and of substantially less width than the corresponding dimension of the slot 72.

In operation, when the slack adjuster is moved in a brake applying direction the cam plate 64 remains stationary as previously mentioned, whereby the tusk 76 on the drive ratchet approaches increasingly closer to the side 78 of the cam slot 72 as the brakes wear until a point is reached at which the tusk engages the side 78 of the slot, the difference in width between the tusk and slot affording lost motion defining acceptable brake wear before slack take-up. When, as a result of further wear, the tusk 76 fully engages the side 78 of the slot, it is caused thereby to move through an angle of sufficient magnitude wherein the end part 80 of the tusk is moved into parallel relationship and out of operative engagement with the outermost edge part 82 of the cam plate as shown by the phantom lines in FIG. 1. Thereafter, should the slack adjuster be caused to move even a greater distance in a brake applying direction, as might be caused by an unusually high braking load, the drive ratchet nevertheless cannot be rotated beyond its original rotation as determined by the relative positions and configurations of the tusk and side or cam face 78.

After the drive ratchet has been rotated to the phantom line position of FIG. 1 as above described, when the brakes are released the slack adjuster is returned in the conventional manner to the brake release position of FIG. 1 whereupon the arcuate rear edge 84 on the tusk engages an arcuate camming edge 86 on the side of the cam slot 72 opposite the side 78 to cause the drive ratchet to rotate clockwise in FIG. 1 whereupon the teeth of the driven ratchet are engaged and the ratchet rotated to cause the gear train to be indexed in a slack take-up direction.

From the foregoing, it should be apparent that the invention comprises essentially stationary and movable parts, one of which includes a pair of spaced-apart cam faces (the sides 78, 86 of the cam slot 72 in the embodiment illustrated) which cooperate with a projection (the tusk 76) carried by the other part to effect rotational movement of the drive ratchet in one direction upon predetermined movement of the slack adjuster in a brake applying direction and thereafter cooperates with the other cam to restore the drive ratchet to its original position upon return of the slack adjuster to brake release position. In accordance with the invention, the spacing and configurations of the cam faces and projection are selected to insure during greater-than-normal brake application indexing of the drive ratchet greater than one but less than two ratchet tooth increments so that when the drive ratchet is restored to its original position upon brake release, the driven ratchet is indexed precisely one tooth increment but no more, and further, the purpose of the single index is to prevent adjustment of the slack until the application has been released, i.e., the slack will not adjust under load.

It is believed that no further explanation of the invention is required in view of the foregoing description. It should be particularly noted that the invention eliminates over adjustment during any single application by specifically not retaining a drive ratchet relatively stationary with respect to the slack adjuster irregardless of the degree or movement of the slack adjuster in a brake applying direction as has been the usual practice heretofore for accomplishing automatic adjustment. It is the elimination of this undesirable feature which enables the slack adjuster of the present invention to be adjusted no more than a single ratchet tooth increment upon any one application of the brake.

It will, of course, be apparent to those skilled in the art that the adjuster of the invention is susceptible of a variety of changes and modifications, without however departing from the scope and spirit of the appended claims.

What is claimed is:

1. In a slack adjuster including a movable body and an arm integral with the body and adapted to be connected to a brake applying member, an internally splined relatively rotatable member carried by said body and adapted to receive therethrough a brake actuator cam shaft, a driven ratchet including incrementally spaced teeth operatively connected to said rotatable member for effecting incremental rotation thereof in a slack take up direction, and a drive ratchet having teeth cooperating with the teeth of said driven ratchet, the invention which comprises means for effecting rotational movement of said driven ratchet in response to a predetermined degree of movement of said body in a brake applying direction, said means including first and second cooperating parts carried respectively by said body and by said drive ratchet, means for holding said first part against movement as the body is moved between brake applied and released positions, one of said parts including a single projection only and the other of said parts including a pair of spaced arms defining a pair of spaced apart camming faces cooperating with said projection, one of said faces being normally spaced from said projection but engageable with the same to rotate said drive ratchet independently of the driven ratchet and in one direction but only after said body is moved the predetermined degree in a brake applying direction, said one cam face and said projection being related in size and configuration that said driven ratchet is rotated more than one but less than two tooth increments during said predetermined degree of movement, said projection and said one cam face being moved clear of the path of movement of one with respect to the other so that continued movement of said slack adjuster beyond the predetermined degree in a brake applying direction has no effect on said drive ratchet, the other of said faces being engageable with said projection to rotate said drive ratchet in the reverse direction to rotate the driven ratchet a one tooth increment upon the return of said slack adjuster to its brake released position.

2. The slack adjuster of claim 1 wherein said cam means is carried by said first part and comprises a slot, the opposed faces of which define the respective cam faces and wherein said projection is integral with said drive ratchet and extends into said slot between said cam faces.

3. The slack adjuster of claim 1 wherein said internally splined member includes an external main worm gear and wherein said driven ratchet is operatively connected to said member through a gear train, said train including at least a main worm drivingly engaging said main worm gear.

4. The slack adjuster of claim 3 including means operatively connected to said driven ratchet for restraining the same against release rotation.

5. The slack adjuster of claim 3 wherein said gear train includes in addition a secondary worm wheel carried by said main worm wheel, a secondary worm drivingly engaging said secondary worm and wherein said driven ratchet is carried by said secondary worm.

6. In a slack adjuster comprising a rockable body and an arm integral with the body and adapted to be connected to a brake applying member, an internally splined rotatable main worm gear carried by said body and adapted to receive therethrough a brake actuator cam shaft, a gear train engaging said main worm gear and comprising a main worm, a secondary worm gear fixed to said main worm and a secondary worm engaging said secondary worm gear, a toothed driven ratchet slidably splined to said secondary worm, a toothed drive ratchet rotatably mounted in said body in axial alignment with said driven ratchet, spring means urging driven ratchet toward said drive ratchet, a cam plate rotatably carried by said body, an arm integral with said cam plate and adapted to be rigidly connected to a stationary part clear of said body so as to prevent turning of said plate as said body is rocked during brake operation, said plate including a part projecting into adjacency with said drive ratchet, a cam slot in said projecting part and having opposed cam faces at its side edges, a projection integral with said drive ratchet and extending into said cam slot, one of said cam faces being normally spaced from said projection and having a configuration such that when said body rocks a greater-than-normal amount the projection engages said one face and is carried clear of said face so that continued movement of said body in a brake applying direction is without effect on said drive ratchet, the other of said cam faces being in a position and of a configuration to engage said projection upon return of said body to brake release position and cause said drive ratchet to be rotated reversely to its original position.

7. The slack adjuster of claim 6 wherein said one cam face is positioned with respect to said drive ratchet that the latter is rotated an amount greater than one but less than two tooth increments when said body is rocked the said greater-than-normal amount.

8. In a slack adjuster including a rockable body and and arm integral with the body and adapted to be connected to a brake applying member, an internally splined relatively rotatable member carried by said body and adapted to receive therethrough a brake actuator cam shaft, a driven ratchet including incrementally spaced teeth operatively connected to said rotatable member for effecting incremental rotation thereof in a slack take up direction, and a drive ratchet having teeth cooperating with the teeth of said driven ratchet, the invention which comprises means for effecting rotational movement of said driven ratchet in response to a predetermined degree of rocking movement of said body in a brake applying direction, said means including first and second cooperating parts carried respectively by said body and by said drive ratchet, means for holding said first part against movement as the body is rocked between brake applied and released positions, one of said parts including a single projection only and the other of said parts including cam means having a pair of spaced apart camming faces between which said projection is normally received, one of said faces engaging said projection to move the latter out of engagement therewith to rotate said drive ratchet in one direction an amount greater than one but less than two tooth increments when said body is rocked in a brake applying direction an amount greater-than-normal and the other of said faces engaging said projection to rotate said drive ratchet in the reverse direction to its original position upon return of said body to its brake released position.

9. The slack adjuster of claim 8 wherein said projection is integral with said drive ratchet and said cam means comprises a slot in said first part, the opposed sides of said slot defining the respective cam faces which cooperate with said projection.

10. The slack adjuster of claim 5 which comprises in addition, means for disengaging said ratchets to permit manual adjustment of the slack adjuster.

11. The slack adjuster of claim 6 which comprises in addition, means for compressing said spring to disengage said ratchets to permit manual adjustment of the slack adjuster.

12. The slack adjuster of claim 8 which comprises in addition, means for disengaging said ratchets to permit manual adjustment of the slack adjuster.

References Cited

UNITED STATES PATENTS 2,920,724   1/1960   Margetic et al. _ _ _ _ 188—79.5 X

DUANE A. REGER, *Primary Examiner.*